(12) United States Patent
Bartholomew et al.

(10) Patent No.: US 6,356,699 B1
(45) Date of Patent: *Mar. 12, 2002

(54) RARE EARTH DOPED OPTICAL GLASSES

(75) Inventors: Roger F. Bartholomew, Painted Post; Heather D. Boek, Corning; Michelle D. Pierson, Painted Post; Carlton M. Truesdale, Corning, all of NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,800

(22) Filed: Aug. 7, 1998

Related U.S. Application Data

(60) Provisional application No. 60/059,920, filed on Sep. 24, 1997.
(51) Int. Cl.⁷ .................................................. G02B 6/00
(52) U.S. Cl. ........................ 385/142; 385/143; 385/144; 385/145; 313/468
(58) Field of Search ................................ 385/141–145; 313/468

(56) References Cited

U.S. PATENT DOCUMENTS

| | | | | |
|---|---|---|---|---|
| 3,634,711 A | * | 1/1972 | Barber | 313/468 |
| 4,962,995 A | | 10/1990 | Andrews et al. | 350/96.34 |
| 5,119,460 A | | 6/1992 | Bruce et al. | 385/142 |
| 5,262,365 A | | 11/1993 | Oyobe et al. | 501/54 |
| 5,351,335 A | | 9/1994 | Ohishi et al. | 385/142 |
| 5,475,528 A | | 12/1995 | LaBorde | 359/341 |
| 5,486,947 A | | 1/1996 | Ohishi et al. | 359/341 |
| 5,537,505 A | | 7/1996 | Borrelli et al. | 385/142 |
| 5,798,306 A | * | 8/1998 | Dickinson, Jr. | 501/57 |

OTHER PUBLICATIONS

Bruce, Allan J. et al., "Concentration and Hydroxyl Impurity Quenching of the . . . Luminescence in $Er^{3+}$ Doped Sodium Silicate Glasses." *Mat. Res. Soc. Symp.*, vol. 244, 1992, p. 157–161.(No Month).

* cited by examiner

*Primary Examiner*—James Phan
(74) *Attorney, Agent, or Firm*—Mary Y. Redman

(57) ABSTRACT

A glass component in an optical system, which may be a lazing or an optical amplifying medium, comprising a silicate base glass doped with at least two Group III B elements, the glass, and a method of preventing clustering of a rare earth metal ion in the glass.

17 Claims, 1 Drawing Sheet

RARE EARTH DOPED OPTICAL GLASSES

Figure 1:
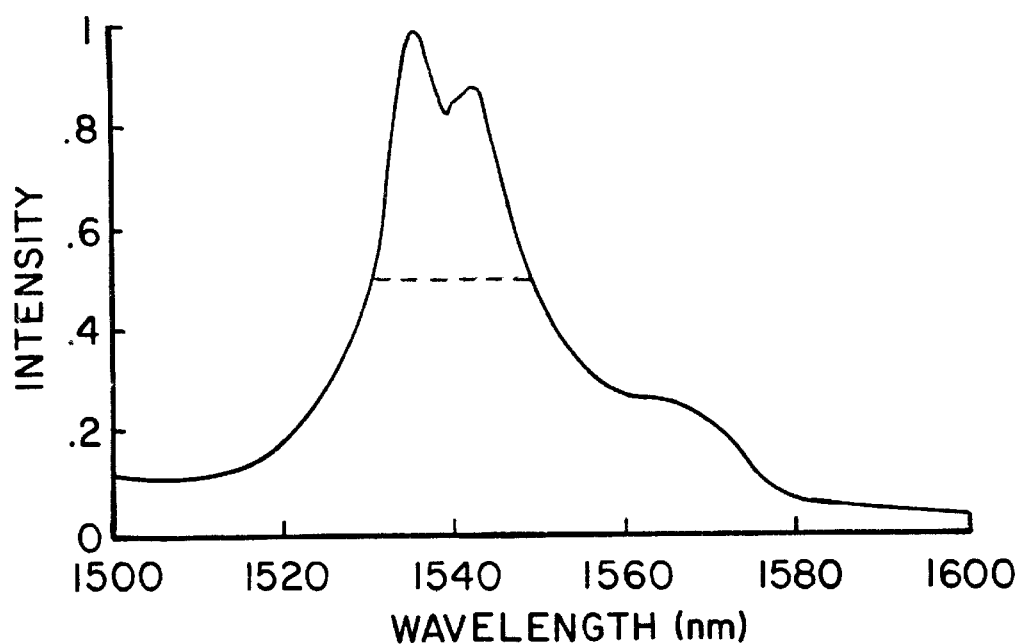

This Application claims benefit of Provisonal No. 60/059,920 filed Sep. 24, 1997.

FIELD OF THE INVENTION

Glasses doped with rare earths, optical devices produced from such glasses, and methods of production.

BACKGROUND OF THE INVENTION

Optical fibers doped with a rare earth are used in producing lasers and amplifiers operative at various wavelengths. An optical signal can be amplified by ion fluorescence within the same operating wavelength region as the signal. Pump energy excites the rare earth metal causing it to fluoresce. This fluorescence, in a wavelength region in which an optical signal operates, amplifies the signal.

Different rare earth metals harmonize at different wavelengths. This makes it necessary to match a particular rare earth with a particular wavelength of interest. For example, excitation of erbium at 980 nm, or 1450 nm, provides pumped energy causing the erbium to fluoresce. Fluorescence in the 1520–1560 nm range allows a signal, operating in this wavelength region, to be amplified.

The significance of the 1550 nm wavelength in optical communication has led to extensive studies of erbium and its behavior as a rare earth dopant of glass. Other rare earth ions can be caused to fluoresce, and thereby amplify a signal, at their different characteristic wavelengths. Accordingly, while the present description is largely directed to erbium, it will be understood that the invention extends equally to other rare earth ions.

It is known that, in optical amplifiers, increased optical gain and decreased lifetime result from increasing the concentration of a fluorescing, rare earth ion. However, this is limited by clustering, a phenomenon that is occasioned by interactions between the same rare earth ions in close proximity to each other.

As the concentration of a rare earth ion, such as erbium, increases beyond a certain point in a glass, the fluorescence signal is quenched. This, in turn, decreases the lifetime of the important fluorescence transition, thereby decreasing the optical gain.

The dopant level of a rare earth ion, for example, erbium, in a glass is critical for controlling optical properties. The ions are raised from ground level to an excited state or level by energy pumped into the glass. The excited ions then undergo radiative decay while fluorescing. Optical signal amplification occurs by the stimulated emission of the signal photon in the excited state role of the ion.

The decay occurs in stages, referred to as fluorescing transitions, during which a proportion of the ion population decays to a given level. The initial level is at 36% of the maximum intensity, and is a reciprocal of the natural log "e." The time required for this to occur is referred to as the lifetime. There are several levels of decay, and a lifetime for each may be measured, and reported, as $e_1$, $e_2$ and $e_3$. However, the lifetime of the first level is usually considered the important level.

Another undesirable effect of clustering is known as upconversion. This occurs when one rare earth ion is said to "steal" a signal from another ion. This is referred to as "sharing" fluorescence. The net result is that the thief goes to a higher energy level, but the victim goes to ground level. The desired population is thereby diminished.

It would, therefore, be highly desirable to provide a means of countering, or avoiding, this detrimental clustering of rare earth ions in glass. That would enable achieving the benefits obtainable with increased concentration of the rare earth in the glass.

It is a basic purpose of the invention to provide a solution to the problem of rare earth clustering in glass. Another purpose is to provide a method of increasing the concentration of a rare earth ion in a glass without quenching the fluorescence signal thereby obtainable. A further purpose is to provide an optical device with enhanced ability to amplify an optical signal and exhibit a longer fluorescence time. Still another purpose is to provide an improved amplifier for an optical signal. A still further purpose is to provide glasses having an enhanced ability to amplify an optical signal.

SUMMARY OF THE INVENTION

The article of the invention is a glass component in an optical system, the glass component comprising a silicate base glass doped with at least two oxides of Group III B elements, at least one of the elements being a rare earth.

The invention resides in part in a silicate glass containing at least two different rare earth/Group III B elements in its composition, at least one of the elements not having open shell "4f" orbitals.

The invention further resides in a method of decreasing clustering of a rare earth element in a silicate glass which comprises including in the glass composition at least one additional rare earth/Group III B element that does not have open shell "4f" orbitals.

The invention also resides in a method of producing a clad optical fiber which comprises forming the core of the fiber from a silicate glass which includes at least two rare earth/Group III B elements in it, composition, one of which does not have open shell "4f" orbitals.

PRIOR ART

Literature known to applicants, and deemed to have possible relevance, is provided in a separate document.

DESCRIPTION OF THE INVENTION

The present invention arose from studies directed at enhancing the amount of a rare earth element that could be included in a silicate glass while minimizing the tendency of such element to cluster in the glass. The problem of clustering is particularly severe in the production of clad optical fiber for devices such as optical amplifiers. However, it also finds application in planar devices, such as lasers and planar waveguides, as well as in MCVD, plasma, or axial vapor deposition processes.

The invention is founded on the discovery that the tendency of a rare earth to cluster can be counteracted by including a second rare earth in the glass composition. This expedient permits increasing the concentration of a desired rare earth metal in a glass while minimizing the loss of optical activity due to clustering of the rare earth in the glass.

The cause of the rare earth clustering is not known with certainty. However, a logical explanation, based on present evidence, is that rare earth ions tend to bond together, rather than dispersing in the glass. This could occur if there were a lack of bonding sites for the rare earth ions in the glass. It also suggests a glass structure such that the rare earth ions are incompatible with other glass ions due to differences in ionic size and charge. This is because the "4f" orbitals are so deeply buried that the electronic configuration is not likely to have any appreciable influence on mutual solubilities.

TABLE I sets forth the crystal ionic radii of several rare earths and transition metal ions of Group III B elements.

TABLE I

| Ion | Ionic Radius | Ion | Ionic Radius |
|-----|--------------|-----|--------------|
| La  | 1.06         | Dy  | 0.90         |
| Ce  | 1.03         | Ho  | 0.89         |
| Pr  | 1.01         | Y   | 0.89         |
| Nd  | 1.00         | Er  | 0.88         |
| Sm  | 0.96         | Tm  | 0.87         |
| Eu  | 0.95         | Yb  | 0.86         |
| Gd  | 0.94         | Lu  | 0.85         |
| Tb  | 0.92         | Sc  | 0.73         |

The crystal ionic radii of $Si^{+4}$ and $Ge^{+4}$, principal ions employed in optical fiber production, are 0.41 and 0.53 Angstrom units. As shown in Table I, the crystal ionic radii of rare earth ions are in the range of 0.8–1.1 Angstroms. This substantial difference in ionic radii strongly suggests why rare earth ions do not disperse well in simple glasses, such as silica and silica-germania glasses.

It is believed that the addition of a second Group IIII B ion provides compatible bonding sites for the initial ion. This reduces the tendency for the initial ion to cluster in a glass. By providing equal concentrations of the two Group IIII B ions, clustering could be reduced by as much as 50%.

The second ion must not have open shell "4f" orbitals. Further, if the glass is being used for a fluorescing effect, as in an amplifier, the second ion must have no interaction with the pump wavelength, or the fluorescence, of the initial ion. For example, by applying these criteria, candidates for the second ion in a glass system doped with erbium, or another rare earth, are yttrium (Y), lanthanum (La), lutetium (Lu), gadolinium (Gd), and europium (Eu). Y, La, Lu, and Sc have no open shell "4f" orbitals. This makes them ideal because they would not be expected to have absorptions that would interfere with any rare earth ion. Gd and Eu have no optical transitions that can interact with pump wavelengths of rare earth ions in the visible or infrared portions of the spectrum.

Fortunately, there is a strong likelihood of finding Group IIII B elements together in minerals. This likelihood is indicated by an X in a box in TABLE II.

TABLE II

|    | Ce | Dy | Er | Eu | Gd | Ho | La | Lu | Pr | Sm | Tb | Tm | Yb |
|----|----|----|----|----|----|----|----|----|----|----|----|----|----|
| Eu | X  | X  |    |    | X  | X  | X  | X  | X  | X  |    | X  | X  |
| Gd | X  | X  | X  | X  |    | X  | X  | X  | X  | X  | X  | X  | X  |
| La | X  | X  |    | X  | X  | X  |    | X  | X  | X  | X  | X  | X  |
| Lu | X  | X  |    | X  | X  | X  | X  |    | X  | X  |    | X  | X  |
| Sc | X  | X  | X  |    | X  | X  |    |    |    |    | X  |    |    |
| Y  | X  | X  | X  | X  | X  | X  | X  | X  | X  | X  | X  | X  |    |

The invention may be practiced by standard glass melting, or by known optical fiber-making procedures, depending on the products being produced. A clad product might be made using the well-known double crucible technique.

An optical fiber may be fabricated by the standard outside vapor deposition (OVD) process. The core cane is produced by delivering precursors for the chosen rare earths to an oxy-gas burner via a bubbler. The precursors may, for example, be rare earth organometallic materials. The principal glass former is delivered to the burner from a separate source in an amount properly proportioned to the amount of rare earth precursors. The precursor for the glass former may, for example, be a chloride, such as $SiCl_4$, $GeCl_4$ and/or $AlCl_3$. Alternatively, it may take the form of organometallic materials, such as octamethyl cyclotetrasiloxane or $Ge(OEth)_4$.

The mixture of products emanating from the oxy-gas burner is deposited on a rotating mandrel to produce a preform. The preform is consolidated into glass to form a blank that is stretched into a cane. The cane is then coated with a silica cladding layer. The clad blank is then consolidated and drawn into fiber.

This customary fiber-forming technique is prone to the occurrence of clustering, except at very low rare earth levels. Therefore, we prefer to employ a well-known glass melting method, double crucible melting, that is commonly used to produce clad products. In this method, two melting units, usually tubular and having a common center, are employed. A core, or interior, component glass is melted in a central melting unit. A cladding glass is melted in an exterior melting unit that surrounds the interior unit. The two glasses are drawn simultaneously to produce a clad product.

It has been found that the fluorescing properties of the rare earths can be substantially enhanced by incorporating them in a fluorinated, alkali silicate glass. In particular, the presence of fluorine in the glass enhances the fluorescence intensity and emissions that occur as an excited rare earth ion returns to its ground, or unexcited, state after being energized.

It is believed that the presence of fluorine in an alkali silicate glass alters the glass structure in a manner such that rare earth clustering is reduced. Optimum effects, in terms of an enhanced rare earth content with minimal clustering, are achieved by combining multiple rare earths with fluorine in an alkali silicate glass. The fluorescence signal is enhanced, thereby increasing optical gain, fluorescence emission (lifetime), and relative quantum efficiency.

Thus, a fluorinated, alkali silicate glass containing multiple rare earths is a unique glass system. At least about 4.5 wt. % F is required to be effective. Up to 13 wt. % may be added, but greater than about 7.5 wt. % is difficult to retain during melting.

A fluorinated alkali silicate base glass provides optimum lifetime values. Addition of up to about 2% $Al_{23}$ serves to stabilize the glass. Other known additions, in particular, the alkaline earth metal oxides, may be present to the extent that they do not interfere with fluorescence or glass transmission. For example, CaO tends to create an opal, particularly in the presence of fluorine. The alkali metal oxides, $Na_2O$ and $K_2O$, are interchangeable in so far as fluorescing properties are concerned. The choice is made based on desired physical properties and material cost. Rubidium and cesium oxides are also effective, but offer no advantage in optical properties.

Reduction in alkali content has the effect of broadening and flattening a fluorescence spectra curve. Potential substitutes for alkali metal oxides include oxides of lead, boron, phosphorous and aluminum. Replacement of alkali by lead is well known in lead silicate glasses. However, melting a fluorine-containing lead silicate glass becomes difficult because of the corrosiveness of lead fluoride. Hence, melting must be done in silica vessels, rather than platinum.

$B_2O_3$ may be substituted for alkali to some extent. However, complete substitution does not provide a batch that will melt to form a glass. Substitution of $P_2O_5$ for alkali tends to form crystals, such as $Na_3Gd(PO_4)_2$.

It has been found that a substantial substitution of alumina for alkali can be made successfully. There is some tendency to phase separate at around 15% alumina, but clear glass is consistently attained at higher and lower alumina contents. Up to about 20 mole % $Al_2O_3$ may be employed, and at least 5% is preferred. Increased silica content enhances the amount of both alumina and fluorine that may be accommodated in a glass melt.

The substitution of alumina for alkali broadens and flattens the fluorescence spectra curve for the glass. This is commonly referred to as increased band width. It represents a broader span of wavelengths over which amplification of a signal can be obtained. At the same time, very acceptable lifetime values are vided.

Figure 2:
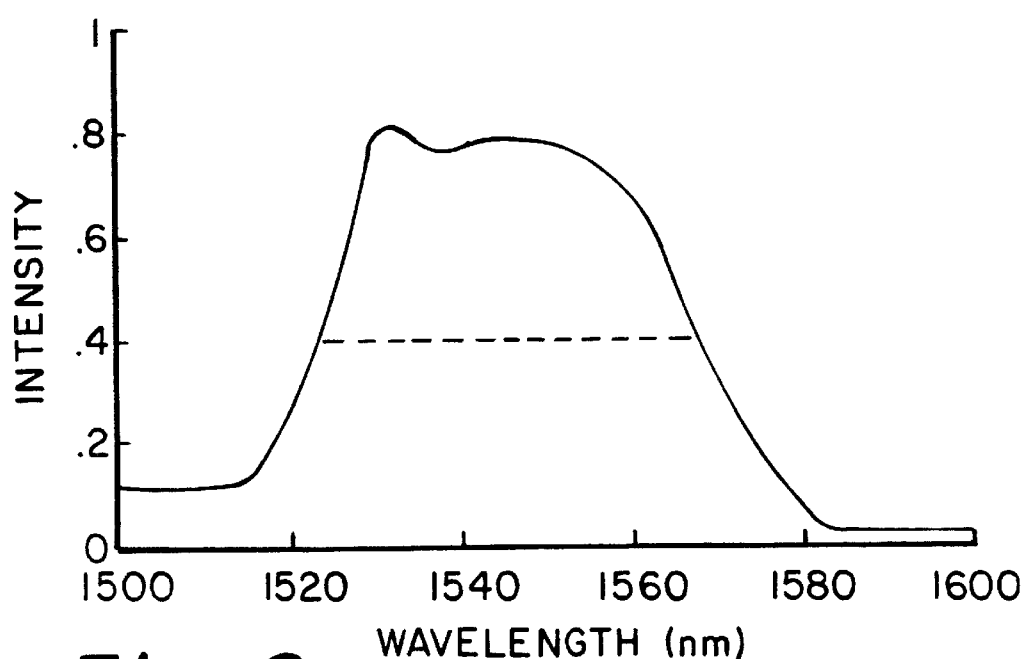

FIG. 1 and 2 in e accompanying drawing illustrate the effects just described. FIGS. 1 and 2 are graphical representations in which wavelength, in nm, is plotted on the horizontal axis. Fluorescence intensity is plotted on the vertical axis.

FIG. 1 shows a typical fluorescence spectra curve for a fluorinated, alkali silicate base glass doped with multiple, rare earth ions. The glass has the composition shown as Example 19 in TABLE VI, infra. The maximum fluorescence level is desirably high. However, the band width is rather narrow as shown by a dotted line A. Band width is measured as the full width of the curve at one-half the maximum intensity, that is, one-half the peak of the curve.

FIG. 2, in contrast, shows a typical fluorescence spectra curve for an aluminosilicate Mass likewise doped with multiple, rare earth ions. The glass has the composition shown at Example 29 in TABLE VII, infra. Here, the curve is not as high at the peak, but the band width is as much as two to three times greater.

In summary, a preferred base glass will consist essentially of, in mole % as calculated from the batch on an oxide basis, 60–75% $SiO_2$, 0–30% $Na_2O$, 0–30% $K_2O$, 5–30% $Na_2O+K_2O$, 0–20% $Al_2O_3$, 0–0.5% $As_2O_3$, plus 4.4–7.5% F by weight.

The invention is further described with respect to specific embodiments, as well as comparative examples. TABLE III sets forth in mole %, four compositions having a typical sodium silicate base glass. The compositions contain increasing amounts of erbium oxide ($Er_2O_3$). Also shown are fluorescence lifetimes in milliseconds (msec) and RQE (percent relative quantum efficiency). Lifetime represents the time that elapses as a generated fluorescence decays to a given extent. The relative quantum efficiency is the ratio of lifetime of the glass of composition 1 to the lifetime of a test piece being examined.

TABLE III

| mole % | 1 | 2 | 3 | 4 |
|---|---|---|---|---|
| $Na_2O$ | 28 | 28 | 28 | 28 |
| $SiO_2$ | 71 | 70.8 | 70.6 | 70 |
| $Al_2O_3$ | 0.82 | 0.82 | 0.82 | 0.82 |
| $As_2O_3$ | 0.21 | 0.21 | 0.21 | 0.21 |
| $Er_2O_3$ | 0.008 | 0.22 | 0.39 | 1 |
| $e^{-1}, e^{-2}, e^{-3}$ (msec) | 16.3 | 13.5 | 5.6 | 2.9 |
|  | 17.1 | 13.7 | 5.7 | 2.5 |
|  | 16.5 | 13.4 | 5.4 | 2.6 |
| % RQE | — | 82.8 | 65.6 | 34.4 |

As used here, "e" is a measured time for a degree of fluorescence decay in microseconds. "e" is the time required for the fluorescence decay curve to decrease by $\frac{1}{2.78}$ from its peak. "$e_2$" is the time for a further decrease by $\frac{1}{2.78}$. Likewise, $e_3$ represents the time for a further $\frac{1}{2.78}$ decrease.

It is readily apparent that erbium oxide is effective as a dopant in very small amounts. However, this effectiveness rapidly diminishes as the erbium oxide content is increased. It becomes essentially nil at 1 mole % for compositions in TABLE III. This is believed to be primarily due to clustering of the erbium ions.

TABLE IV sets forth a number of compositions illustrative of alkali metal silicate glasses doped with multiple rare earths in accordance with the present invention.

TABLE IV

| mole % | 2 | 5 | 6 | 7 | 8 | 9 | 10 |
|---|---|---|---|---|---|---|---|
| $Na_2O$ | 28 | 27.9 | 28 | 28.5 | 28 | 28.5 | 27.8 |
| $SiO_2$ | 70.8 | 64 | 64 | 65.3 | 64 | 65.3 | 63.0 |
| $Al_2O_3$ | 0.82 | 0.8 | 0.8 | 0.82 | 0.8 | 0.82 | 0.81 |
| $As_2O_3$ | 0.21 | 0.21 | 0.21 | 0.21 | 0.21 | 0.21 | 0.21 |
| $Y_2O_3$ | — | 6.94 | — | 1 | — | 1 | 6.84 |
| $La_2O_3$ | — | — | 6.77 | — | — | — | — |
| $Gd_2O_3$ | — | — | — | 3.91 | 6.77 | 3.73 | — |
| $Er_2O_3$ | 0.22 | 0.22 | 0.22 | 0.22 | 0.22 | 0.4 | 0.39 |
| $e^{-1}, e^{-2}, e^{-3}$ (msec) | 13.5 | 12.9 | 11.4 | 13.8 | 14.3 | 10.9 | 11.2, |
|  | 13.7 | 13.0 | 11.4 | 14.3 | 14.2 | 11.1 | 11.3, |
|  | 13.4 | 12.9 | 11.7 | 14.3 | 13.6 | 11.2 | 11.3 |
| % relative quantum efficiency | 82.8 | — | 88.4 | 100 | 100 | 82 | 83 |

Glass batches, based on these compositions, were prepared by mixing materials commonly used in glass making, including oxides and carbonates. Typically, in addition to rare earth oxides, and a fining agent, a batch was composed of sodium carbonate, sand and alumina. The batch materials were ball-milled, placed in platinum crucibles, and melted at 1450° C. for four hours. The molten glass was poured on a plate, cooled, re-melted and poured in bar molds. The glass bars were annealed at 575–600° C.

Samples were cut into 2.54×2.54×1.27 cm. (1"×1"½") test pieces and polished on all faces. Lifetime measurements were made on the polished samples employing a 6.0 watt All Lines Argon laser. The laser beam was passed through a polished sample to a germanium detector. This converted the input light to a voltage signal which was collected by an acquisition board. Fluorescence decay data were measured between 1500–1600 nm, collected and analyzed by a computer program. Fluorescence properties, where available, are shown in TABLE IV.

In general, fluorescence lifetime and quantum efficiency decrease as erbium oxide contents increase in a glass from 0.008%–1 mole %. Addition of lanthanum oxide is relatively ineffective for signal amplification. However, this oxide may be useful for refractive index and other optical properties. Gadolinium oxide ($Gd_2O_3$) is more effective for amplification, as is yttrium oxide ($Y_2O_3$). None of these oxides affect fluorescent spectra, so are particularly useful in conjunction with erbium oxide.

TABLE V shows a series of compositions that are illustrative of glasses relatively ineffective for present purposes at higher erbium levels.

TABLE V

| mole % | 11 | 12 | 13 | 14 |
|---|---|---|---|---|
| $Na_2O$ | 28 | 28.3 | 28 | 28 |
| $SiO_2$ | 64 | 65 | 64 | 64.1 |
| $Al_2O_3$ | 0.8 | 0.82 | 0.8 | 0.81 |
| $As_2O_3$ | 0.21 | 0.21 | 0.21 | 0.21 |
| $Y_2O_3$ | — | 1.0 | — | 5.89 |
| $La_2O_3$ | 6.6 | 4.13 | — | — |
| $Gd_2O_3$ | — | — | 6.0 | — |
| $Er_2O_3$ | 0.39 | 0.39 | 1.0 | 1.0 |

TABLE V-continued

| mole % | 11 | 12 | 13 | 14 |
|---|---|---|---|---|
| $e^{-1}, e^{-2}, e^{-3}$ (msec) | 9.8, 9.9, 9.9 | 8.3, 8.6, 8.8 | 5.0, 4.9, 5.0 | 5.4, 5.5, 5.6 |
| % relative quantum efficiency | 76 | 63.8 | 22.7 | 46 |

Glasses 11 and 12 show the relative ineffectiveness of lanthanum, as compared to yttrium or gadolinium. Glasses 13 and 14 show the ineffectiveness of Gd and Y as the content of Er is increased to 1 mole %. However, Gd and Y are effective in fluorinated versions of glasses 13 and 14.

TABLE VI sets forth representative compositions of fluorinated, multiple rare earth, alkali metal silicate glasses. These glasses represent a preferred embodiment of the present invention. Glasses having these compositions were batched, mixed and melted as described for previous examples. Test pieces were polished, and fluorescent properties measured, also as described previously.

TABLE VI

| mole % | 15 | 16 | 17 | 18 | 19 | 20 | 21 | 22 | 23 | 24 | 25 |
|---|---|---|---|---|---|---|---|---|---|---|---|
| $Na_2O$ | 18 | 18 | 18 | 18 | 18 | 18 | 17 | 14 | 14 | 14 | — |
| $xNa_2O$ | 10.5 | 10.5 | 10.5 | 10.5 | 10 | 10 | 11 | 14.5 | 14.5 | 14.5 | — |
| $K_2O$ | — | — | — | — | — | — | — | 0 | 0 | 0 | 12 |
| $xK_2O$ | — | — | — | — | — | — | — | 0 | 0 | 0 | 16.5 |
| $SiO_2$ | 65.3 | 65.3 | 65.3 | 65.3 | 64 | 64 | 64 | 65.3 | 65.3 | 65.3 | 65.3 |
| $Al_2O_3$ | 0.82 | 0.82 | 0.82 | .82 | 0.81 | 0.81 | 0.81 | 0.82 | 0.82 | 0.82 | 0.82 |
| $As_2O_3$ | 0.21 | 0.21 | 0.21 | 0.21 | 0.21 | 0.21 | 0.21 | 0.21 | 0.21 | 0.21 | 0.21 |
| $Y_2O_3$ | 1 | 1 | 1 | 1 | 6.94 | 5.16 | 0 | 1 | 1 | 1 | 1 |
| $Gd_2O_3$ | 3.91 | 3.73 | 3.13 | 2.13 | 0 | 0 | 6.77 | 3.91 | 3.73 | 3.13 | 3.73 |
| $Er_2O_3$ | 0.22 | 0.39 | 1 | 2 | 0.22 | 2 | 0.22 | 0.22 | 0.39 | 1 | 0.39 |
| $SnO_2$ | — | — | — | — | — | — | 0 | — | — | — | — |
| F(wt.) | 5.13 | 5.13 | 5.12 | 5.1 | 5.01 | 4.83 | 4.92 | 7 | 7 | 6.97 | 7.1 |
| $e^{-1}, e^{-2}, e^{-3}$ (msec) | 23.8 | 19.0 | 15.4 | 8.1 | 19.6 | 8.5 | 15.7 | 22.8 | 23.1 | 20.0 | 27.4 |
|  | 18.5 | 18.6 | 14.2 | 8.1 | 18.1 | 7.5 | 16.4 | 19.8 | 22.5 | 20.7 | 23.8 |
|  | 18.6 | 18.6 | 14.4 | 8.3 | 19.3 | 7.8 | 16.8 | 19.9 | 22.2 | 20.4 | 23.3 |
| % RQE | 100 | 100 | 86.5 | 45.5 | 100 | 54.8 | — | 100 | 100 | 100 | 100 |
| bandwidth (nm.) | — | — | — | — | 20.5 | — | — | — | — | — | — |

The small x in front of $Na_2O$ and $K_2O$ indicates that these values are calculated from NaF and KF in the glass batch.

Glasses based on the compositions of TABLE VI, but containing 2% and 3% $Er_2O_3$, were melted and measured as described for the glasses of TABLE VI. These glasses with higher erbium content demonstrated that, as the erbium content increased, the unique effects achieved by using a fluorinated glass gradually diminish.

It has been observed that alumina can be substituted in part for alkali to effectively produce an aluminosilicate base glass. Total substitution produces compositions difficult to melt. Therefore, we prefer to retain about 5% alkali metal oxide. The change to an aluminosilicate base glass tends to broaden and flatten the fluorescence spectra, that is, broaden the bandwidth, as shown in FIG. 2.

Table VII sets forth several representative compositions illustrating inventive glasses having an aluminosilicate base.

TABLE VII

| mole % | 26 | 27 | 28 | 29 | 30 | 31 |
|---|---|---|---|---|---|---|
| $Na_2O$ | — | — | 5 | 5 | — | 5 |
| $K_2O$ | 5 | 5 | — | — | 5 | — |
| $Al_2O_3$ | 15 | 20 | 15 | 20 | 20 | 15 |
| $SiO_2$ | 75 | 70 | 75 | 70 | 70 | 75 |
| $As_2O_3$ | 0.21 | 0.21 | 0.21 | 0.21 | 0.21 | 0.21 |
| $Gd_2O_3$ | 3.91 | 3.91 | 3.91 | 3.91 | 3.91 | 3.91 |
| $Y_2O_3$ | 1.0 | 1.0 | 1.0 | 1.0 | 1.0 | 1.0 |
| $Er_2O_3$ | 0.22 | 0.22 | 0.22 | 0.22 | 0.22 | 0.22 |
| F(wt.) | — | — | — | — | 11 | 10.4 |
| $e^{-1}, e^{-2}, e^{-3}$ (msec) | 7.9 | 10.4 | 11.4 | 11.8 | — | — |
|  | 8.4 | 10.6 | 11.7 | 12.2 |  |  |
|  | 8.6 | 10.7 | 12.0 | 12.4 |  |  |
| bandwidth (nm) | 41.3 | 53.8 | — | 55.5 | — | — |

Batches based on these compositions were prepared as described above. They were melted in platinum crucibles for four hours, poured, cooled and re-melted to improve homogeneity. The melting temperature, 1575° C., was necessarily higher than that for an alkali silicate base glass.

A single mode clad fiber was produced employing the glass of Example 24 as a core glass. A non-erbium silicate glass having the composition, in mole %, of 28% $Na_2O$, 64% $SiO_2$, 0.8% $Al_2O_3$, 0.28% $As_2O_3$, 6.16% $Y_2O_3$ and 1.0% $Gd_2O_3$, was employed as a cladding glass. A batch composition for each glass was formulated, and a batch based thereon was mixed. The batches were fed into the inner and outer, concentric melting units of a typical double crucible apparatus. The batch for core glass 24 was fed into the inner vessel, and the batch for the cladding was fed to the outer vessel.

The glasses were melted at about 1460° C. A clad fiber was drawn with conditions being varied to provide fiber core diameters ranging from 4 to 10 microns and overall diameters ranging from 60 to 120 microns. The core glass has an upconversion constant of $2.6 \times 10^{-19}$ cm$^3$ sec$^{-1}$, appreciably lower than values measured on doped borosilicate and Ge—Al doped silicate base glasses.

We claim:

1. A glass component in an optical system comprising a fluorescing silicate base glass doped with at least two oxides of Group III B elements, at least one of the elements being a rare earth.

2. A glass component in accordance with claim 1 in which the silicate base glass is doped with erbium.

3. A glass component in accordance with claim 2 in which the silicate base glass contains, as the second dopant, an oxide of an element selected from yttrium, gadolinium and lanthanum.

4. A glass component in accordance with claim 1 in which the base glass is an alkali metal silicate glass.

5. A glass component in accordance with claim 1 in which the base glass is an alumino silicate glass.

6. A glass component in accordance with claim 1 in which the base glass is a fluorinated silicate glass having a fluorine content of at least 4.5% by weight.

7. A glass component in accordance with claim 1 in which the glass is a component of a laser or an optical amplifier.

8. A glass component in accordance with claim 1 in which the component is an optical signal carrier.

9. A glass component in accordance with claim 8 in which the component is a clad, optical waveguide fiber.

10. A glass component in accordance with claim 8 in which the component is a planar optical amplifier, or a fiber optical amplifier.

11. A method of decreasing clustering of a rare earth element in a fluorescing silicate glass which comprises including in the glass composition at least one additional Group III B element.

12. A method in accordance with claim 11 wherein the rare earth element subject to clustering is erbium.

13. A method in accordance with claim 11 wherein the additional Group III B element is yttrium, gadolinium or lanthanum.

14. A method in accordance with claim 11 wherein the silicate glass is an alumino silicate glass.

15. A method in accordance with claim 11 wherein the silicate glass is a fluorinated silicate glass.

16. A method in accordance with claim 11 which comprises forming an optical fiber core by delivering the precursors of at least two different rare earth element oxides of Group III B elements, and the precursor of an oxide glass former, to an oxy-gas burner to form an oxide mixture, and depositing the mixture on a mandrel to form a preform for the core.

17. A method in accordance with claim 16 which further comprises depositing a cladding oxide layer on the preform, and drawing a fiber from the clad core.

* * * * *